Oct. 1, 1946.  H. TRAVIS  2,408,706

ROTATING MEANS FOR AIRPLANE LANDING WHEELS

Filed May 16, 1945

*INVENTOR.*
HENRY TRAVIS
BY
*Victor J. Evans & Co.*
ATTORNEYS

Patented Oct. 1, 1946

2,408,706

UNITED STATES PATENT OFFICE 2,408,706

ROTATING MEANS FOR AIRPLANE LANDING WHEELS

Henry Travis, Ocean Beach, Calif.

Application May 16, 1945, Serial No. 594,111

1 Claim. (Cl. 244—103)

My present invention, in its broad aspect, has to do with improvements in means for setting up rotation of aircraft landing wheels prior to their engagement with the ground whereby to eliminate wear due to frictional resistance in overcoming inertia occasioned by a stationary wheel coming suddenly in contact with the ground at high speed to reduce wear and tear on the landing gear generally occasioned by the shock or impact, and the strain of a stationary wheel suddenly contacting the ground at high speeds, and to otherwise eliminate undesirable results occasioned by the aforementioned static condition of the landing wheels upon contacting the ground, among which may be mentioned friction burns and abrasions.

It is my purpose to accomplish the above and other ends by providing on the landing wheels or on discs attached to the land wheels, cupped streamlined vanes for contacting the air to set up a rotary impulse on the wheels as they are lowered preparatory to landing; these vanes being so contoured and designed that a speed of rotation approaching that of the wheels on landing is contemplated as the ultimate end to be attained, and so disposed as to not interfere with retraction of the wheels in the housing nacelles. Ordinarily, landing wheels when equipped with my invention will spin rapidly when first lowered due to air speed, but this will decrease as the plane approaches the ground in its landing glide to a desired speed of rotation at the moment of contact with the ground.

Other and equally important objects and advantages will be apparent from the following detailed description taken with the accompanying drawing, but since changes in form, size, shape, proportion, construction and arrangement of parts may be indicated by varying conditions of practical application, interpretation of the scope of my invention should only be conclusive when made in the light of the claim.

In the drawing wherein I have illustrated a preferred form of my invention—

In the drawing wherein like characters of reference are used to designate like or similar parts throughout the several views—

The numeral 1 designates an aircraft landing wheel, 2 the hub, 3 the rim, and 4 the tire. These parts are conventional.

Figure 1:
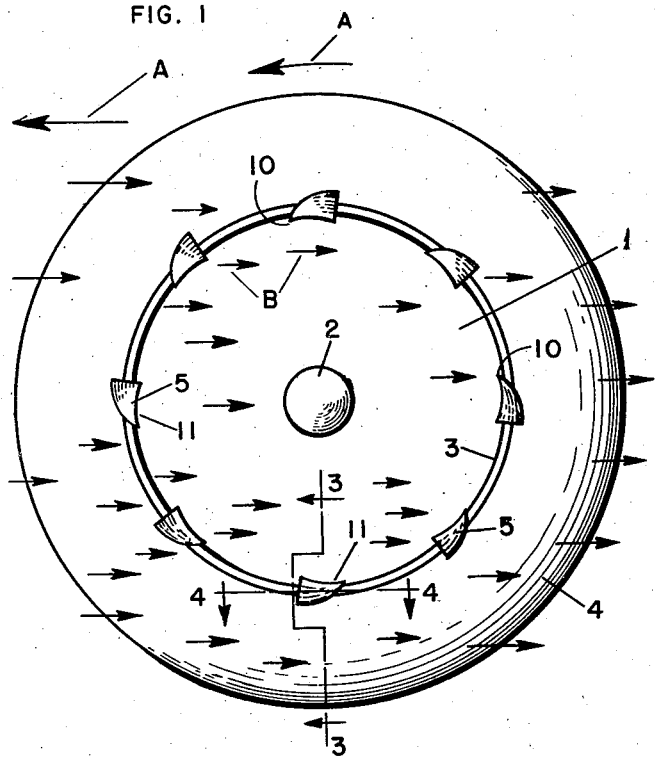
Figure 1 is a side elevation of an aircraft landing wheel equipped with my invention.
Figure 2:
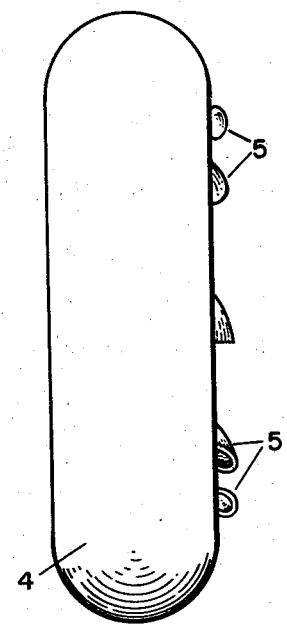
Figure 2 is a front view.
Figure 3:
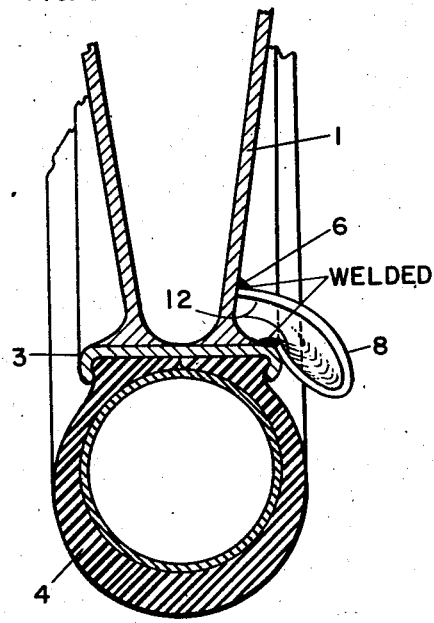
Figure 3 is a transverse section taken on the line 3—3 of Figure 1.
Figure 4:
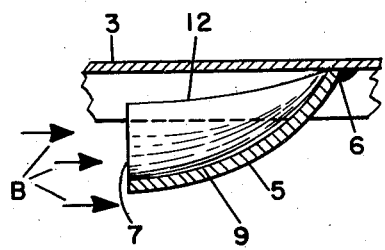
Figure 4 is a longitudinal section taken on the line 4—4 of Figure 1.

As shown by the large arrows A in Figure 1, the wheel 1 is assumed to be carried toward the left, while the air pressure is in the direction of the small arrows B. My vanes 5 are streamlined and cup-shaped and are welded as at 6 to the wheel adjacent the rim 3; they are circumferentially mounted in uniformly spaced relationship as shown in Figures 1 and 2 with the mouth portions 7 directed about the wheel in the same direction; which direction is determined by presenting the mouth part to the air body at the lower part of the wheel to cause the wheel to receive a rotational impulse in the same direction as in landing. The leading or front edge 8 of each vane is substantially elliptical as shown in Figure 3; the body part 9 of each vane decreases rearwardly in diameter to the relatively sharp tail part 10 which is slightly curved in toward the hub as at 11. As shown in Figure 3, the body and mouth are curved up toward the tire, with the base edges 12 offset from each other. At the top of the wheel, the mouth parts face backwardly and set up some suction or drag which is advantageous, and the streamlined contours afford the least resistance to forward motion of the aircraft and at the same time give the maximum rotational impulse to the wheels.

From the foregoing, it is believed that the operation and advantages of my invention will be apparent, but it is again emphasized that interpretation of its scope should only be conclusive when made in the light of the subjoined claim.

I claim:

In combination with a landing wheel for aircraft, a plurality of cup-shaped downwardly curved, streamlined vanes having pointed tails, having one edge welded to the wheel adjacent to the rim and the other edge welded to the rim adjacent the first weld, said vanes arranged in spaced circumferential relationship to rotate the wheel by contact of the vanes with the air body prior to landing.

HENRY TRAVIS.